(12) United States Patent
Feng et al.

(10) Patent No.: US 11,858,382 B2
(45) Date of Patent: Jan. 2, 2024

(54) SEAT ROTATION LOCKING MECHANISM (71) Applicant: Yanfeng International Seating Systems Co., Ltd., Shanghai (CN)

(72) Inventors: Qingwei Feng, Shanghai (CN); Jiabin Ding, Shanghai (CN); Feixiang Zhu, Shanghai (CN)

(73) Assignee: YANFENG INTERNATIONAL SEATING SYSTEMS CO. LTD., Shanghai (CN)

( * ) Notice: Subject to any disclaimer, the term of this patent is extended or adjusted under 35 U.S.C. 154(b) by 0 days.

(21) Appl. No.: 17/263,390

(22) PCT Filed: May 9, 2019

(86) PCT No.: PCT/CN2019/086227
§ 371 (c)(1),
(2) Date: Jan. 26, 2021

(87) PCT Pub. No.: WO2020/019827
PCT Pub. Date: Jan. 30, 2020

(65) Prior Publication Data
US 2021/0162890 A1 Jun. 3, 2021

(30) Foreign Application Priority Data
Jul. 27, 2018 (CN) .......................... 201810847736.0

(51) Int. Cl.
B60N 2/14 (2006.01)
A47C 3/18 (2006.01)

(52) U.S. Cl.
CPC ................ *B60N 2/146* (2013.01); *A47C 3/18* (2013.01)

(58) Field of Classification Search
CPC .......... B60N 2/146; B60N 2/0806; A47C 3/18
See application file for complete search history.

(56) References Cited

U.S. PATENT DOCUMENTS 3,910,633 A 10/1975 Marsh
3,975,050 A * 8/1976 McKee .................... B60N 2/02
297/344.22
(Continued)

FOREIGN PATENT DOCUMENTS

CN 202641426 U 1/2013
CN 104924926 A 6/2015
(Continued)

OTHER PUBLICATIONS

International Search Report dated Jul. 26, 2019 in connection with PCT International Application No. PCT/CN2019/086227.
(Continued)

Primary Examiner — Philip F Gabler
(74) Attorney, Agent, or Firm — John P. White (57) ABSTRACT The present invention discloses a seat rotation locking mechanism, including a locking mechanism mounted on a rotating disc in a seat rotation mechanism and at least one lockhole disposed on an outer circumference of a fixed disc in the seat rotation mechanism, where the locking mechanism includes: a lock support fixed on the rotating disc; and at least two lock pins horizontally and moveably configured in the lock support, where a first end of the lock pin is of a truncated-cone-shaped structure; and the first end of the lock pin is inserted into the lockhole, to implement zero-clearance locking by using wedging between the truncated-cone-shaped structure of the first end of the lock pin and the lockhole. The present invention eliminates a fit clearance existing after a rotation mechanism is locked, improves a grade of a product, and improves user experience. In an adjustment process, even if an operator releases an adjustment lever, a locking piece and a fixed disc do not generate scraping noise, and service life of the product is prolonged since wearing is eliminated.

17 Claims, 11 Drawing Sheets

(56) References Cited

U.S. PATENT DOCUMENTS

| | | | | |
|---|---|---|---|---|
| 4,671,572 | A * | 6/1987 | Young | B60N 2/02 |
| | | | | 297/344.1 |
| 5,482,354 | A * | 1/1996 | Gryp | B60N 2/143 |
| | | | | 297/344.22 |
| 6,021,989 | A * | 2/2000 | Morita | B60N 2/143 |
| | | | | 297/344.26 |
| 6,361,111 | B1 * | 3/2002 | Bowers | A47C 3/18 |
| | | | | 297/344.22 |
| 7,108,325 | B2 * | 9/2006 | Williamson | B60N 2/08 |
| | | | | 297/344.22 |
| 8,827,345 | B2 * | 9/2014 | VanMiddendorp | B60N 2/0228 |
| | | | | 297/344.22 |
| 9,265,349 | B1 * | 2/2016 | Jensen | A47C 3/18 |
| 9,597,981 | B2 * | 3/2017 | Kim | B60N 2/0818 |
| 10,688,889 | B2 * | 6/2020 | Feng | B60N 2/42736 |
| 10,857,914 | B2 * | 12/2020 | Feng | B60N 2/146 |
| 2008/0211284 | A1 * | 9/2008 | Mutou | B60N 2/146 |
| | | | | 297/354.1 |
| 2011/0240820 | A1 * | 10/2011 | Napau | B60N 2/0875 |
| | | | | 248/429 |
| 2021/0161296 | A1 * | 6/2021 | Feng | A47C 3/18 |
| 2021/0162890 | A1 * | 6/2021 | Feng | A47C 3/18 |

FOREIGN PATENT DOCUMENTS

| | | |
|---|---|---|
| CN | 107953806 A | 4/2018 |
| CN | 108968465 A | 12/2018 |
| JP | 200408443 A | 1/2004 |
| WO | WO 2020/019827 A1 | 1/2020 |

OTHER PUBLICATIONS

Written Opinion (form PCT/ISA/237) dated Jul. 26, 2019 in connection with PCT International Application No. PCT/CN2019/086227.

* cited by examiner

SEAT ROTATION LOCKING MECHANISM

CROSS-REFERENCE TO RELATED APPLICATIONS

This application is a § 371 national stage of PCT International Application No. PCT/CN2019/086227, filed May 9, 2019, claiming priority of Chinese Patent Application No. 201810847736.0, filed Jul. 27, 2018, the entire contents of each of which are hereby incorporated by reference into the subject application.

BACKGROUND

Technical Field

The present invention relates to the technical field of seats, and in particular, to a seat rotation locking mechanism.

Related Art

Currently, for a rotating seat, there are mainly the following several locking mechanisms:

1. The locking mechanism implements locking by inserting a claw-shaped or tooth-shaped member in whole into a corresponding lockhole. There is a fit clearance between a contour of the claw-shaped member or the tooth-shaped member and a contour of the lockhole, which generates noise and shake in a driving process, and this type of technology is mainly represented in "COMMERCIAL VEHICLE SEAT WITH LOCKING PIECE" disclosed in Chinese Patent Authorized Publication No. CN103863151B, "ROTATING DISC FOR CAR SEAT" disclosed in Chinese Patent Application No. CN106427682A, the document disclosed in Korean Application No. KR100799874B1, and "NOVEL ROTATOR MECHANISM OF ROTATING SEAT" disclosed in Chinese Patent Application No. CN102529756A.

2. The locking mechanism implements locking by inserting a cylindrical pin into a hole between a fixed disc and a rotating disc from bottom to top. Similarly, there is also a fit clearance between a single hole and a shaft, which generates noise and shake in a driving process. This type of technology is mainly represented in "SEAT ROTATION MECHANISM" disclosed in Chinese Patent Application No. CN104670256A and "ROTATING CAR SEAT" disclosed in Chinese Patent Authorized Publication No. CN206520509U.

The locking mechanisms in the prior art both use fitting between metal members, which generates friction-induced noise.

In the prior art, when rotating adjustment is performed, a lever needs to be pulled all the time. If the lever is released halfway, a locking member and a rotating plane generate scraping noise. In addition, two cases may occur during the rotating adjustment: One case is that the adjustment is performed by lifting the lever when sitting on a seat. The other case is that the rotating adjustment is performed outside the car, and in this case, it is quite inconvenient to pull the lever all the time.

SUMMARY

A technical problem to be solved by the present invention is to provide a seat rotation locking mechanism in response to the deficiencies existing in the prior art, and the seat rotation locking mechanism eliminates a fit clearance existing after a rotation mechanism is locked, improves a grade of a product, and improves user experience. In an adjustment process, even if an operator releases an adjustment lever, a locking piece and a fixed disc do not generate scraping noise, and furthermore service life of the product is prolonged since wearing is eliminated.

The technical problem to be solved by the present invention may be implemented by the following technical solutions.

A seat rotation locking mechanism includes a locking mechanism mounted on a rotating disc in a seat rotation mechanism and at least one lockhole disposed on an outer circumference of a fixed disc in the seat rotation mechanism, where the locking mechanism includes:

a lock support fixed on the rotating disc; and at least two lock pins horizontally and moveably configured in the lock support, where a first end of the lock pin is of a truncated-cone-shaped structure; and the first end of the lock pin is inserted into the lockhole, to implement zero-clearance locking by using wedging between the truncated-cone-shaped structure of the first end of the lock pin and the lockhole.

In an exemplary embodiment of the present invention, the seat rotation locking mechanism further includes a lock pin return spring sleeved on each lock pin, where when the lock pin return spring is in a locked state, the first end of the lock pin is inserted, under the action of the lock pin return spring, into the lockhole on the outer circumference of the fixed disc to lock the rotating disc.

In an exemplary embodiment of the present invention, the seat rotation locking mechanism further includes a release lever hinged to a top surface of the lock support through a release lever rotating shaft, where the release lever includes a release end and an operation end, the release lever is driven by operating the operation end of the release lever to rotate, and the release end of the release lever drives the lock pin to move toward a release direction, so that the first end of the lock pin exits from the lockhole on the outer circumference of the fixed disc to release the rotating disc; and a release lever return spring connected to the release lever and the lock support or the rotating disc, where the release lever return spring drives the release lever to return to the locked state; and during releasing, the release lever return spring accumulates energy.

In an exemplary embodiment of the present invention, at least one outward protruding portion is disposed on the outer circumference of the fixed disc, the lockhole is disposed on each outward protruding portion, each outward protruding portion is transitionally connected to the remaining part of the outer circumference of the fixed disc through an arc-shaped guiding plane, the first end of the lock pin is not in contact with the remaining part of the outer circumference of the fixed disc before entering the arc-shaped guiding plane, and the first end of the lock pin is in contact with the arc-shaped guiding plane after entering the arc-shaped guiding plane.

In an exemplary embodiment of the present invention, a kidney-shaped hole is disposed on a top surface of the lock support and a cam rotating along with a release lever rotating shaft is fixed to a shaft end of the release lever rotating shaft on one side of the top surface provided with the kidney-shaped hole, a stop pin avoiding slot and a stop pin limiting slot that are in communication with each other are disposed on the cam and a squeezing shifting plate is disposed axially on the cam, an axis disposition point between the squeezing shifting plate and the cam is located on a first end of the squeezing shifting plate, the first end of the squeezing shifting plate is connected to the lock support through a squeezing shifting plate return spring, and a stop pin is fixed between the first end and a second end of the squeezing shifting plate; a squeezing protrusion is disposed at a position, close to the lockhole, on the outer circumference of the fixed disc; after the release lever is lifted to a release position, the cam rotates to the release position along with the release lever rotating shaft, in this case, the stop pin on the squeezing shifting plate passes through the stop pin limiting slot and the kidney-shaped hole and the stop pin is limited in the stop pin limiting slot and to a position of a first end of the kidney-shaped hole, the release lever is enabled to be at a release position all the time and not return to a locking position even if a hand is released, and the release end of the release lever drives the lock pin to be at the release position all the time, so that a tip of the first end of the lock pin is not in contact with the remaining part of the outer circumference of the fixed disc all the time and not scraped; and when the rotating disc rotates to the locking position, the second end of the squeezing shifting plate is in contact with the squeezing protrusion, the squeezing shifting plate turns over under the action of the squeezing protrusion, to enable the stop pin to pass through the stop pin avoiding slot and the kidney-shaped hole and enable the stop pin to be located in the stop pin avoiding slot and at a position of a second end of the kidney-shaped hole, in this case, the stop pin limiting slot in the cam does not limit the stop pin, the release lever returns to the locking position again under the action of the release lever return spring, and the lock pin is enabled to return to the locking position under the action of the lock pin return spring.

In an exemplary embodiment of the present invention, a silencing bushing is disposed in the lockhole, and in the locked state, the first end of the lock pin is inserted into the silencing bushing under the action of the lock pin return spring to lock the rotating disc.

In an exemplary embodiment of the present invention, a plastic clip is mounted to a position at which a lockhole is disposed on the fixed disc, a guiding notch corresponding to the lockhole is disposed on the plastic clip, and the first end of the lock pin enters the lockhole through bottom guidance of the guiding notch in the plastic clip.

In an exemplary embodiment of the present invention, a silencing cap is sleeved on a tip of the first end of the lock pin, and the silencing cap is in contact with the outer circumference of the fixed disc.

In an exemplary embodiment of the present invention, a buffer component is fixed to the release lever, and in the locked state, the release lever is in contact with the lock support through the buffer component, to eliminate noise generated due to a jolt of the release lever in a running process.

In an exemplary embodiment of the present invention, the lock support includes a first end surface close to the outer circumference of the fixed disc, a second end surface disposed opposite to the first end surface, and a top surface connecting the first end surface and the second end surface; at least two first lock pin protruding holes are disposed on the first end surface, at least two second lock pin protruding holes are disposed on the second end surface, and the first lock pin protruding holes on the first end surface and the second lock pin protruding holes on the second end surface are in a one-to-one correspondence and coaxial; and a first end and a second end of each lock pin respectively protrude from a corresponding first lock pin protruding hole and a corresponding second lock pin protruding hole.

In an exemplary embodiment of the present invention, a releasing plate is fixed to each lock pin, one end of the lock pin return spring is in contact with the releasing plate, and the other end is in contact with the first end surface or the second end surface; in the locked state, the release end of the release lever is not in contact with the releasing plate, in a released state, the release end of the release lever is in contact with the releasing plate and drives the lock pin, through the releasing plate, to move toward the release direction, and when the release lever is located at a middle position, the release end of the release lever is in contact with the releasing plate and drives the lock pin, through the releasing plate, to move toward the release direction.

In an exemplary embodiment of the present invention, at least two releasing shifting forks are disposed at the release end of the release lever, each releasing shifting fork corresponds to one lock pin, in the locked state, the releasing shifting fork is not in contact with the releasing plate, in the released state, the releasing shifting fork is in contact with the releasing plate and drives the lock pin, through the releasing plate, to move toward the release direction, and when the release lever is located at the middle position, the releasing shifting fork is in contact with the releasing plate and drives the lock pin, through the releasing plate, to move toward the release direction.

In an exemplary embodiment of the present invention, two blocking points are disposed on the outer circumference of the fixed disc, and the two blocking points are arranged at 180° and fit in with the seat rotation locking mechanism, to limit a rotation angle of the rotating disc to 0 to 180° through the seat rotation locking mechanism.

Since the foregoing technical solutions are used, compared with the prior art, the present invention has the following advantages:

(1) Locking in a Y direction is implemented by using two independent lock pins.
(2) Friction-induced noise is eliminated through fit between truncated cones at the first ends of the two lock pins and the silencing bushing.
(3) Zero clearance is implemented by using a wedging principle of the truncated cones at the first ends of the two lock pins.
(4) In a rotating adjustment process, the release lever may be released, and scraping does not occur between the lock pin and the outer circumference of the rotating disc.
(5) Two blocking points arranged at 180° are disposed on the fixed disc, and during rotating adjustment, the rotation may be from the front to the rear, and then from the rear to the front only according to one direction, thereby avoiding unlimited rotation to twist off a wire bundle of a seat.
(6) A buffer component is disposed between the release lever and the lock support, to eliminate noise generated due to a jolt of the release lever in a running process.

The present invention eliminates a fit clearance existing after a rotation mechanism is locked, improves a grade of a product, and improves user experience. In an adjustment process, even if an operator releases an adjustment lever, a locking piece and a fixed disc do not generate scraping noise, and service life of the product is prolonged since wearing is eliminated.

DETAILED DESCRIPTION

The following describes the present invention in detail with reference to the accompanying drawings and specific implementations.

Embodiment 1

Referring to FIG. 1 to FIG. 9, a seat rotation locking mechanism is shown, including a locking mechanism 200, where the locking mechanism 200 is mounted on a rotating disc 110 in a seat rotation mechanism 100 to rotate along with the rotating disc 110. Two lockholes 121a are uniformly disposed on an outer circumference 121 of a fixed disc 120 in the seat rotation mechanism 100, and a central angle between the two lockholes 121a is 180°. Each lockhole 121a is a kidney-shaped lockhole, to accommodate two lock pins at the same time.

The locking mechanism 200 includes a lock support 210, two lock pins 220 and 230, two lock pin return springs 240 and 250, a release lever 260, and a release lever return spring 270.

Figure 7:
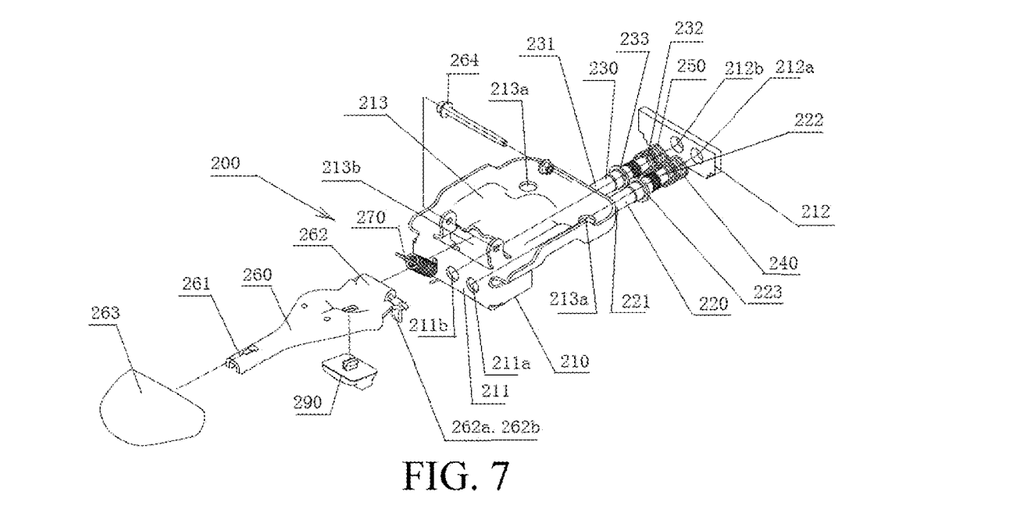
FIG. 7 is a schematic exploded view of the locking mechanism according to Embodiment 1 of the present invention.
Figure 8:
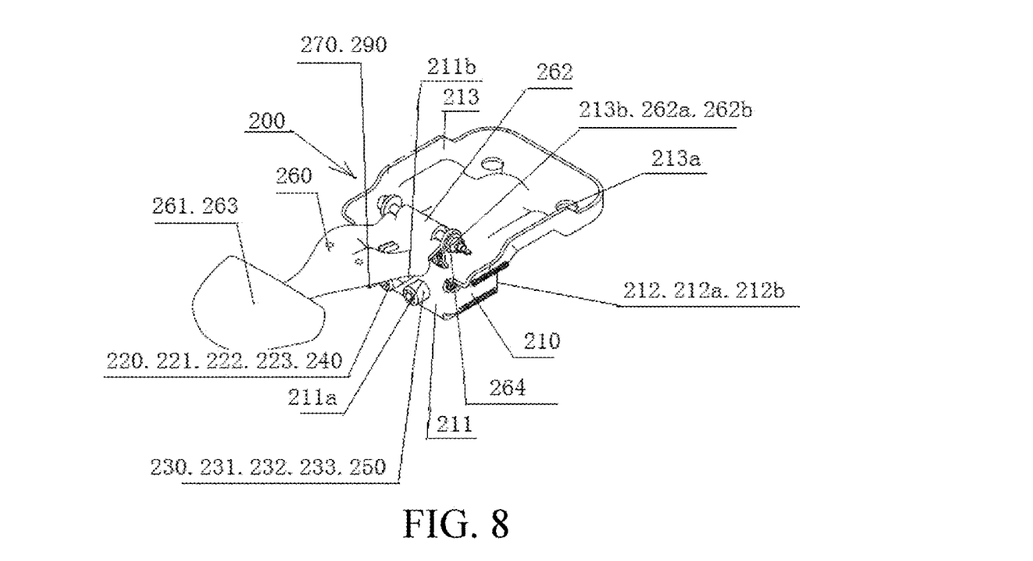
FIG. 8 is a schematic structural diagram of the locking mechanism viewed from one direction according to Embodiment 1 of the present invention.
Figure 9:
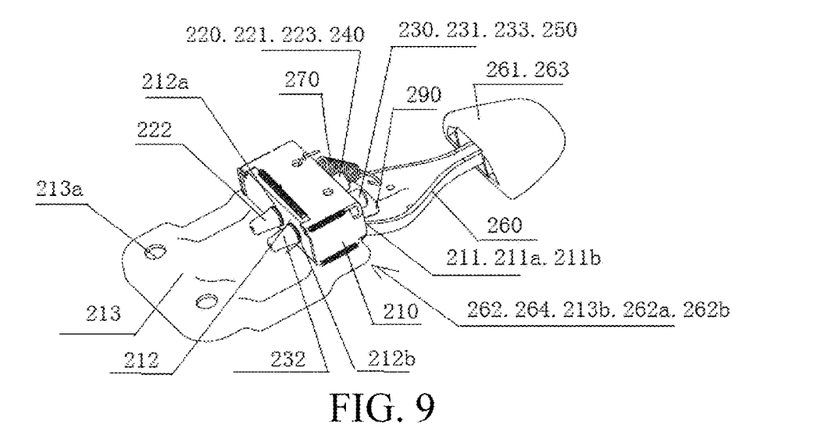
FIG. 9 is a schematic structural diagram of the locking mechanism viewed from another direction according to Embodiment 1 of the present invention.

The lock support 210 includes a first end surface 211 close to the outer circumference 121 of the fixed disc 120, a second end surface 212 disposed opposite to the first end surface 211, and a top surface 213 connecting the first end surface 211 and the second end surface 212.

Two through holes 213a are disposed at one end, close to the center of the seat rotation mechanism 100, of the top surface 213, two bolts 111 are fixed to the rotating disc 110 at the same time, and nuts 112 are tightened after the two bolts 111 passes through the two through holes 213a, to fixedly mount the locking mechanism 200 to the rotating disc 110.

Two first lock pin protruding holes 211a and 211b are disposed on the first end surface 211 of the lock support 210, and two second lock pin protruding holes 212a and 212b are disposed on the second end surface 212 of the lock support 210. The first lock pin protruding hole 211a on the first end surface 211 and the second lock pin protruding hole 212a on the second end surface 212 are coaxial, and the first lock pin protruding hole 211b on the first end surface 211 and the second lock pin protruding hole 212b on the second end surface 212 are coaxial. A first end 221 and a second end 222 of one lock pin 220 respectively protrude from the corresponding first lock pin protruding hole 211a and the corresponding second lock pin protruding hole 212a, and a first end 231 and a second end 232 of the other lock pin 230 respectively protrude from the corresponding first lock pin protruding hole 211b and the corresponding second lock pin protruding hole 212b. Each of the first ends 221 and 231 of the two lock pins 220 and 230 is of a truncated-cone-shaped structure.

Figure 10:
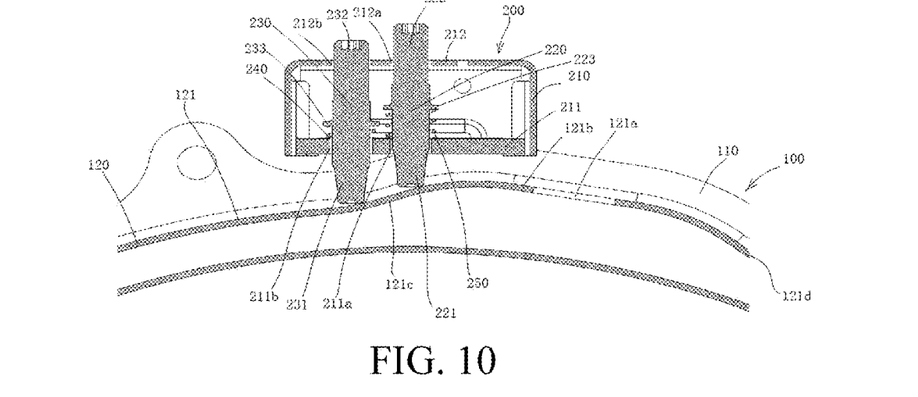
FIG. 10 is a schematic diagram of a state that a lock pin in the locking mechanism enters an arc-shaped guiding plane according to Embodiment 1 of the present invention.
Figure 11:
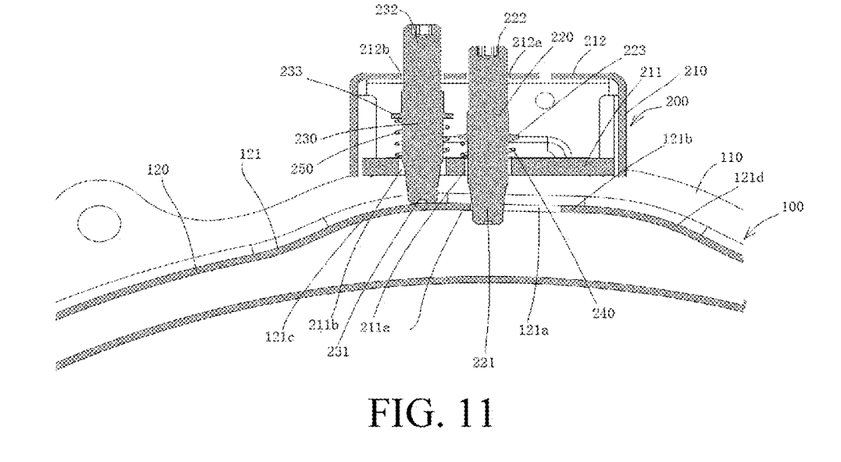
FIG. 11 is a schematic diagram of a state that a lock pin in the locking mechanism is inserted into a lockhole according to Embodiment 1 of the present invention.
Figure 13:
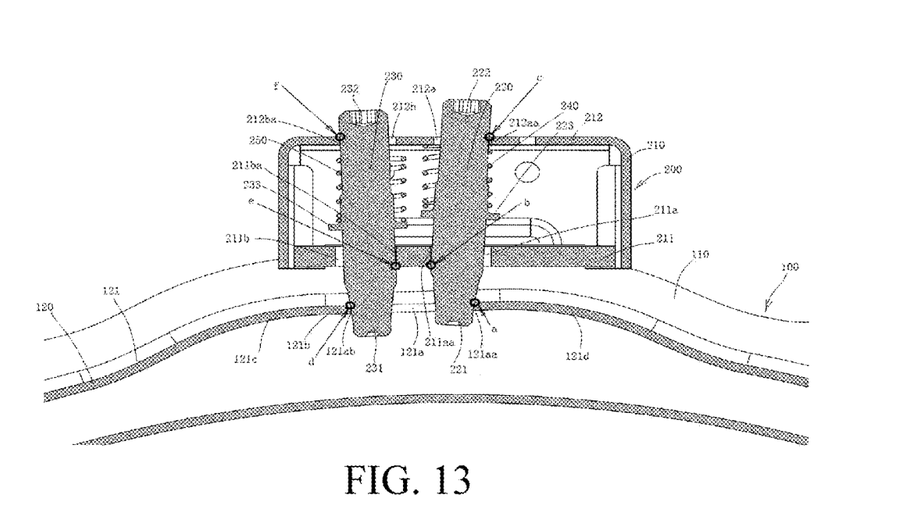
FIG. 13 is a schematic diagram of a state that two lock pins in the locking mechanism are inserted into a lockhole according to Embodiment 1 of the present invention.

Releasing plates 223 and 233 are respectively fixed to the two lock pins 220 and 230, and the two lock pin return springs 240 and 250 are respectively sleeved on the two lock pins 220 and 230. If the two lock pin return springs 240 and 250 are tension springs (as shown in FIG. 10 and FIG. 11), two ends of the two lock pin return springs 240 and 250 are respectively in contact with the releasing plates 223 and 233, and the other two ends of the two lock pin return springs 240 and 250 are both in contact with the first end surface 211 of the lock support 210. If the two lock pin return springs 240 and 250 are compression springs, two ends of the two lock pin return springs 240 and 250 are respectively in contact with the releasing plates 223 and 233, and the other two ends of the two lock pin return springs 240 and 250 are both in contact with the second end surface 212 of the lock support 210 (as shown in FIG. 13). In a locked state, the first ends of the two lock pins 220 and 230 are inserted, under the action of the two lock pin return springs 240 and 250, into the lockhole 121*a* on the outer circumference 121 of the fixed disc 120 to lock the rotating disc 110.

The release lever 260 includes an operation end 261 and a release end 262, an operation lever sleeve 263 is mounted on the operation end 261, and two releasing shifting forks 262*a* and 262*b* extending downward may be disposed at the release end 262. A rectangular hole 213*b* is disposed on the top surface 213 of the lock support 210, and the two releasing shifting forks 262*a* and 262*b* extending downward of the release end 262 pass through the rectangular hole 213*b* and are respectively forked onto the two lock pins 220 and 230.

The release end 262 of the release lever 260 is hinged to the top surface 213 of the lock support 210 through a release lever rotating shaft 264. The release lever return spring 270 may be a torsion spring or a tension spring. If the release lever return spring is a torsion spring, the torsion spring is wound around the release lever rotating shaft 264, one end of the torsion spring acts on the release lever 260, and the other end acts on the top surface 213 of the lock support 210. In this embodiment, the release lever return spring 270 is a tension spring, one end of which is hooked to the release lever 260, and the other end of which is hooked to the lock support 210. In the locked state, the release lever return spring 270 may enable the release lever 260 to be at a locking position all the time. During releasing, the two releasing shifting forks 262*a* and 262*b* at the release end 262 of the release lever 260 drives, through the releasing plates 223 and 233, the two lock pins 220 and 230 to move toward a release direction, so that the first ends 221 and 231 of the two lock pins 220 and 230 exit from the lockhole 121*a* on the outer circumference 121 of the fixed disc 120 to release the rotating disc 110; and the release lever return spring 270 accumulates energy.

Figure 1:
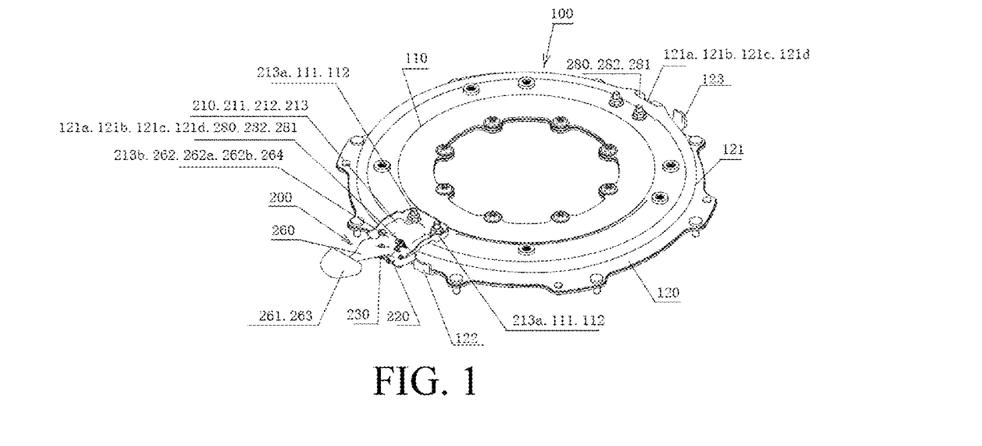
FIG. 1 is a three-dimensional schematic diagram of assembling between a locking mechanism and a seat rotation mechanism according to Embodiment 1 of the present invention.
Figure 2:
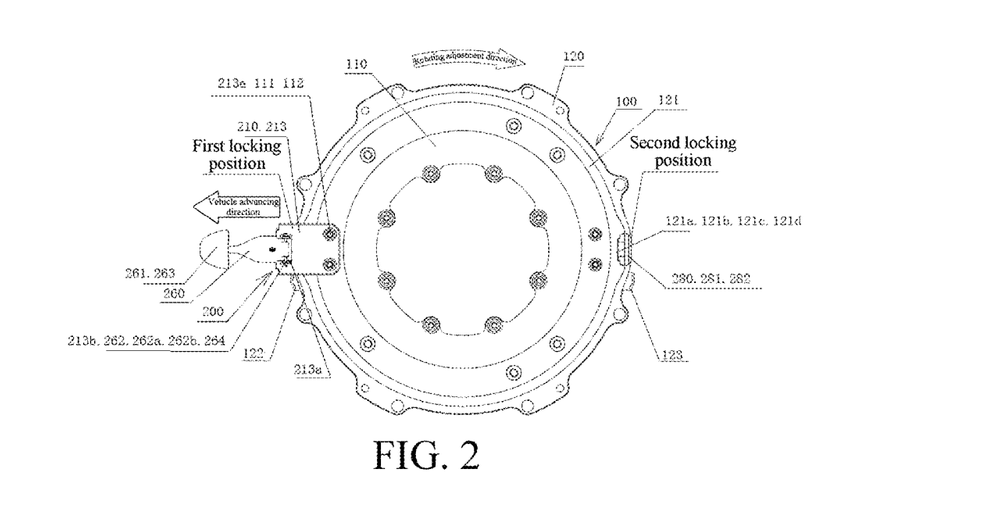
FIG. 2 is a schematic bottom view of the assembling between the locking mechanism and the seat rotation mechanism according to Embodiment 1 of the present invention.
Figure 3:
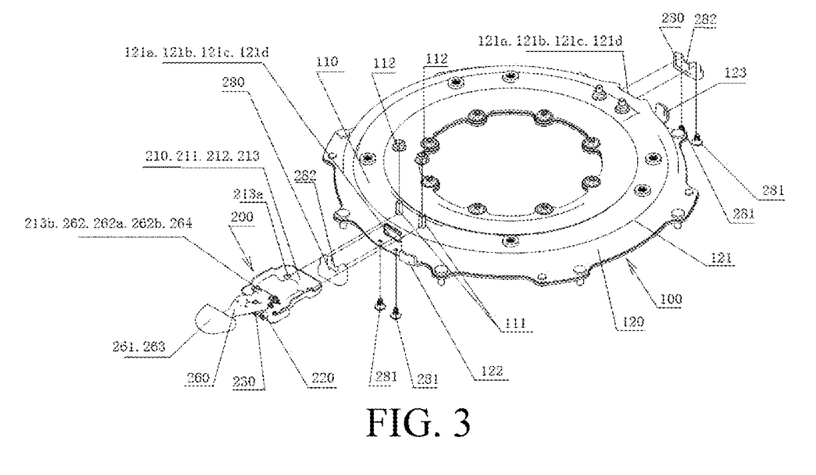
FIG. 3 is a schematic exploded view of the locking mechanism and the seat rotation mechanism according to Embodiment 1 of the present invention.
Figure 4:
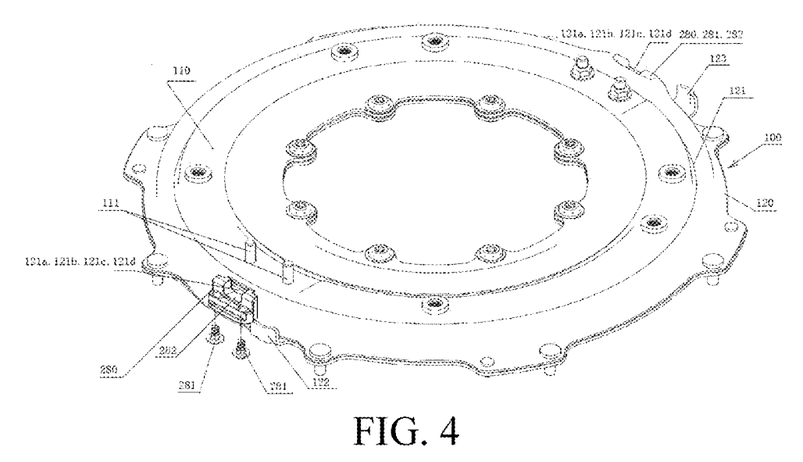
FIG. 4 is a schematic diagram of assembling between a plastic clip and the seat rotation mechanism according to Embodiment 1 of the present invention.

To well insert the first ends of the two lock pins 220 and 230 into the lockhole 121*a* on the outer circumference 121 of the fixed disc 120, in this embodiment, a plastic clip 280 is mounted, by using two screws 281, to a position at which the lockhole 121*a* is disposed on the fixed disc 120, and a guiding notch 282 corresponding to the lockhole 121*a* is disposed on the plastic clip 280. The first ends 221 and 231 of the two lock pins 220 and 230 enter the lockhole 121*a* through bottom guidance of the guiding notch 282 in the plastic clip 280.

In this embodiment, a releasing process is that the operation end 261 of the release lever 260 is lifted up by using a hand, so that the release lever 260 rotates around the release lever rotating shaft 264; and the two releasing shifting forks 262*a* and 262*b* of the release end 262 of the release lever 260 drives, through the releasing plates 223 and 233, the two lock pins 220 and 230 to move toward the release direction, so that the first ends 221 and 231 of the two lock pins 220 and 230 exit from the lockhole 121*a* on the outer circumference 121 of the fixed disc 120 to release the rotating disc 110.

In addition, to eliminate noise generated due to a jolt of the release lever 260 in a running process, a buffer component 290 is fixed to the release lever 260. In the locked state, the release lever 260 is in contact with the lock support 210 through the buffer component 290, and the noise generated due to the jolt of the release lever 260 in the running process may be eliminated by fitting in with the release lever return spring 270.

Figure 5:
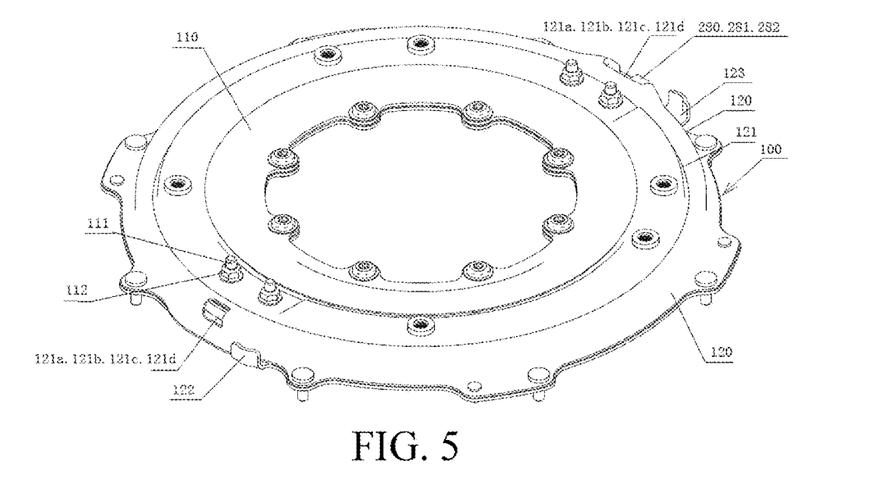
FIG. 5 is a schematic structural diagram of the seat rotation mechanism according to Embodiment 1 of the present invention.
Figure 6:
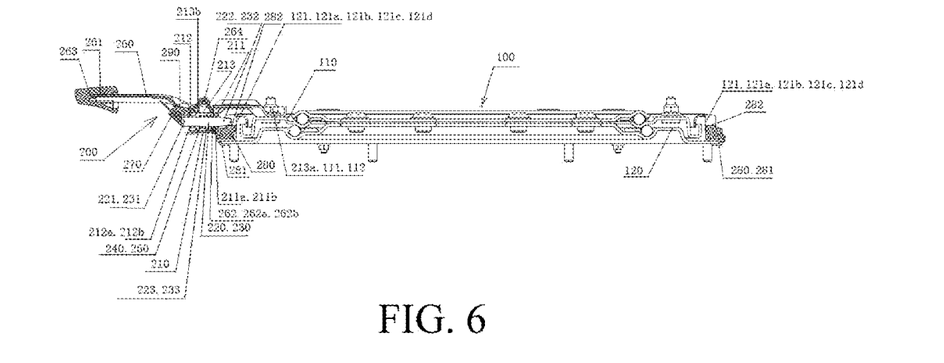
FIG. 6 is a schematic sectional view of the assembling between the locking mechanism and the seat rotation mechanism according to Embodiment 1 of the present invention.

To alleviate noise generated due to scraping between tips of the first ends 221 and 231 of the two lock pins 220 and 230 and the outer circumference 121 of the fixed disc 120 in a rotation process, two methods may be used in this embodiment to solve the problem: One method is that a silencing cap (not shown) is sleeved on the tips of the first ends 221 and 231 of the two lock pins 220 and 230, and the silencing cap is in contact with the outer circumference 121 of the fixed disc 120. The other method is that two outward protruding portions 121*b* distributed at 180° are disposed on the outer circumference 121 of the fixed disc 120, each lockhole 121*a* is disposed on each outward protruding portion 121*b*, and each outward protruding portion 121*b* is transitionally connected to the remaining part of the outer circumference 121 of the fixed disc 120 through arc-shaped guiding planes 121*c* and 121*d*. Before entering the arc-shaped guiding planes 121*c* and 121*d*, the first ends 221 and 231 of the two lock pins 220 and 230 are not in contact with the remaining part of the outer circumference 121 of the fixed disc 120, and the first ends 221 and 231 of the two lock pins 220 and 230 are in contact with the arc-shaped guiding planes 121*c* and 121*d* only after entering the arc-shaped guiding planes 121*c* and 121*d*. In this way, lengths of the tips of the first ends 221 and 231 of the two lock pins 220 and 230 that are in contact with the outer circumference 121 of the fixed disc 120 are reduced, thereby effectively reducing noise generated due to scraping.

Referring to FIG. 10, before the rotating disc 110 rotates to the locking position, the first ends 221 and 231 of the two lock pins 220 and 230 first enter the arc-shaped guiding plane 121*c*. In this case, neither of the first ends 221 and 231 of the two lock pins 220 and 230 is aligned with the lockhole 121*a*, and the first ends 221 and 231 of the two lock pins 220 and 230 butt against and slide on the arc-shaped guiding plane 121*c* of the outer circumference 121 of the fixed disc 120.

Referring to FIG. 11, with continuous rotation of the rotating disc 110, when the first end 221 of the first lock pin 220 is aligned with the lockhole 121*a*, under the action of restoring force of the lock pin return spring 240, the first end 221 of the first lock pin 220 is ejected and inserted into the lockhole 121*a*, and the first end 231 of the second lock pin 230 continues to butt against and slide on the arc-shaped guiding plane 121*c* of the outer circumference 121 of the fixed disc 120.

Figure 12:
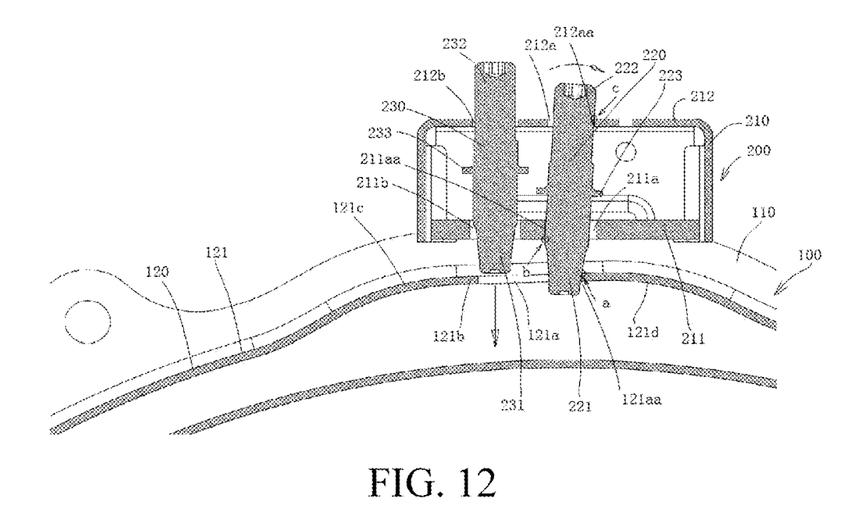
FIG. 12 is a schematic diagram of a state that another lock pin in the locking mechanism is aligned with a lockhole according to Embodiment 1 of the present invention.

Referring to FIG. 12, with the continuous rotation of the rotating disc 110, the first end 231 of the second lock pin 230 is also aligned with the lockhole 121*a*. In this case, the first end 221 of the first lock pin 220 has come into contact with a hole wall 121*aa* on one side of the lockhole 121*a*, and deflects under the action of the hole wall 121*aa* on this side to make room for insertion of the first end 231 of the second lock pin 230 into the lockhole 121*a*, and under the action of restoring force of the lock pin return spring 250, the first end 231 of the second lock pin 230 is ejected and inserted into the lockhole 121*a*.

Referring to FIG. 13, with the continuous rotation of the rotating disc 110, the first ends 221 and 231 of the two lock pins 220 and 230 are both inserted into the lockhole 121*a* and tilt respectively as shown in FIG. 13. The first end 221 of the lock pin 220 forms two contact points a and b with the hole wall 121*aa* of the lockhole 121*a* and a hole wall 211*aa* of the first lock pin protruding hole 211*a* on the first end surface 211 of the lock support 210, and the second end 222 of the lock pin 220 forms a third contact point c with a hole wall 212*aa* of the second lock pin protruding hole 212*a* on the second end surface 212 of the lock support 210. Besides, the first end 231 of the lock pin 230 forms two contact points d and e with a hole wall 121ab of the lockhole 121a and a hole wall 211ba of the first lock pin protruding hole 211b on the first end surface 211 of the lock support 210, and the second end 232 of the lock pin 230 forms a third contact point f with a hole wall 213ba of the second lock pin protruding hole 213b on the second end surface 212 of the lock support 210. The two lock pins 220 and 230 wedge the fixed disc 120 and the rotating disc 110 together through the six contact points a, b, c, d, e, and f, thereby effectively eliminating a fit clearance existing after the rotation mechanism is locked, improving a grade of a product, and improving user experience.

In addition, to prevent the rotating disc 110 from rotating by over 180° to twist off a wire bundle of a seat, in this embodiment, two blocking points 122 and 123 are disposed on the outer circumference 121 of the fixed disc 120. The two blocking points 122 and 123 are arranged at 180° and fit in with the seat rotation locking mechanism, to limit a rotation angle of the rotating disc 110 to 0 to 180° through the seat rotation locking mechanism. In this way, when the seat rotation mechanism 100 performs rotating adjustment, the rear may only be rotated from the front according to one direction, and then the front is rotated from the rear, thereby avoiding unlimited rotation to twist off the wire bundle of the seat.

Embodiment 2

Figure 14:
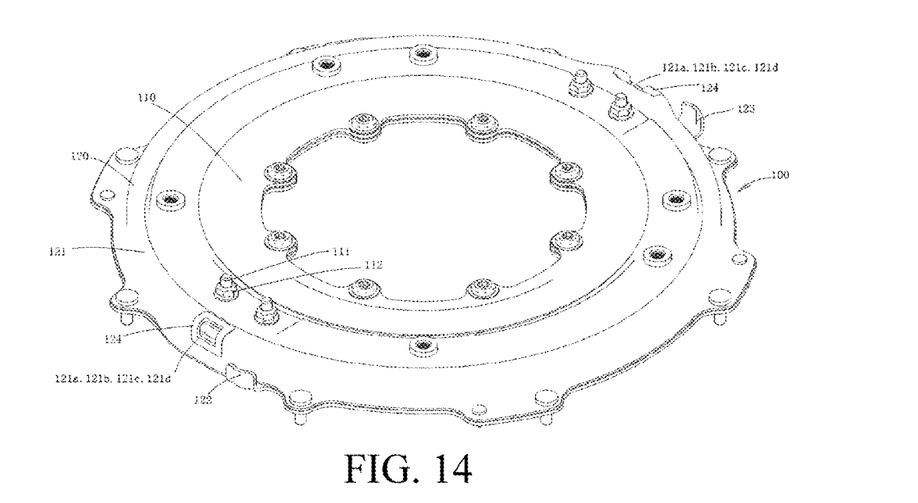
FIG. 14 is a schematic diagram of assembling between a silencing bushing and a seat rotation mechanism according to Embodiment 2 of the present invention.

To further solve the problem that the tips of the first ends 221 and 231 of the two lock pins 220 and 230 are in contact with the outer circumference 121 of the fixed disc 120 and scraped, in this embodiment, improvements are further performed to Embodiment 1, and the improvements are as follows: Referring to FIG. 14, a silencing bushing 124 is disposed in the lockhole 121a, and in the locked state, the first ends 221 and 231 of the two lock pins 220 and 230 are inserted, under the action of the lock pin return springs 240 and 250, into the silencing bushing 124 to lock the rotating disc 110.

Figure 15:
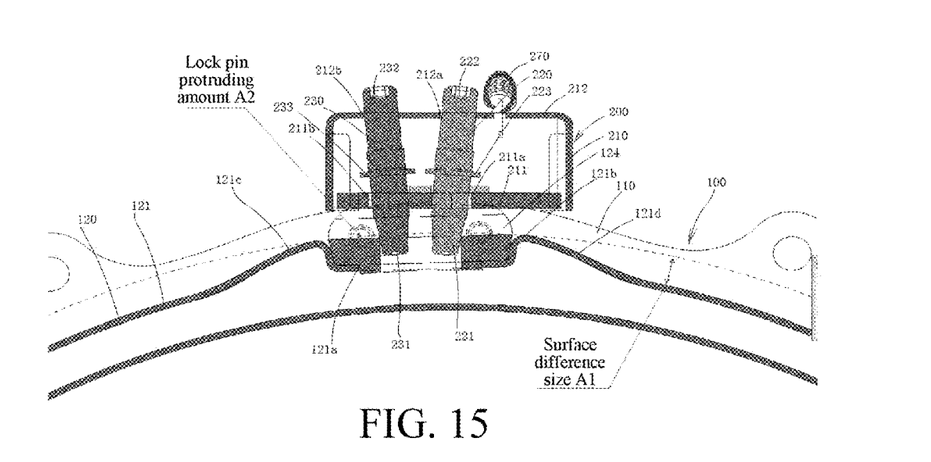
FIG. 15 is a schematic diagram of a state that two lock pins in a locking mechanism are inserted into the silencing bushing according to Embodiment 2 of the present invention.
Figure 16:
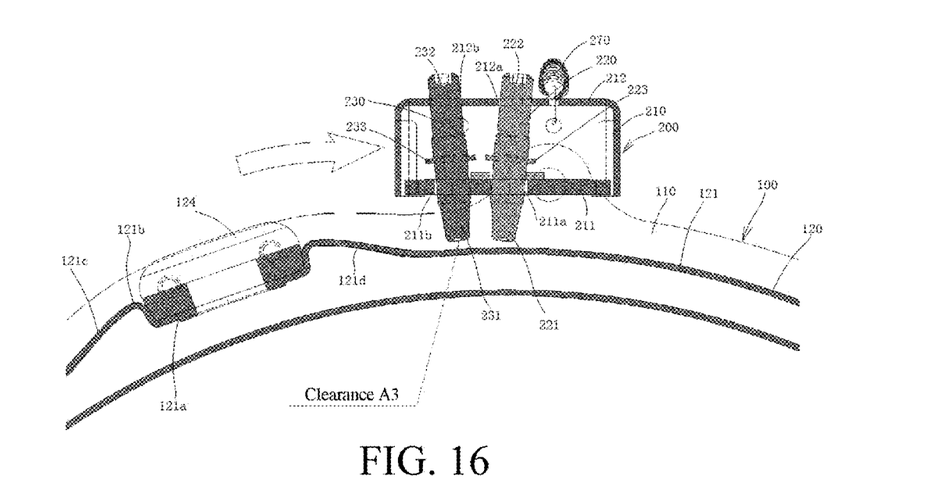
FIG. 16 is a schematic diagram of a state that after the two lock pins in the locking mechanism exit from the silencing bushing and rotate by an angle, tips of first ends of the two lock pins are not in contact with an outer circumference of a fixed disc according to Embodiment 2 of the present invention.

Referring to FIG. 15 and FIG. 16, it is set that an insertion amount of the first ends 221 and 231 of the two lock pins 220 and 230 inserted into the silencing bushing 124 is A2, and a size of a surface difference between the outward protruding portion 121b on the outer circumference 121 of the fixed disc 120 and the remaining part of the outer circumference 121 of the fixed disc 120 is A1, where A1 is greater than A2 by 2.5 mm to 3 mm. In this way, in a process of the rotating adjustment, even if the release lever 260 is released, there is always a clearance A3 between the tips of the first ends 221 and 231 of the two lock pins 220 and 230 and the remaining part of the outer circumference 121 of the fixed disc 120, to avoid a case that the tips of the first ends 221 and 231 of the two lock pins 220 and 230 are in contact with the remaining part of the outer circumference 121 of the fixed disc 120 to generate scraping noise, and eliminate an embarrassment that it is inconvenient to lift up the release lever all the time during adjustment outside a car in the prior art.

Figure 17:
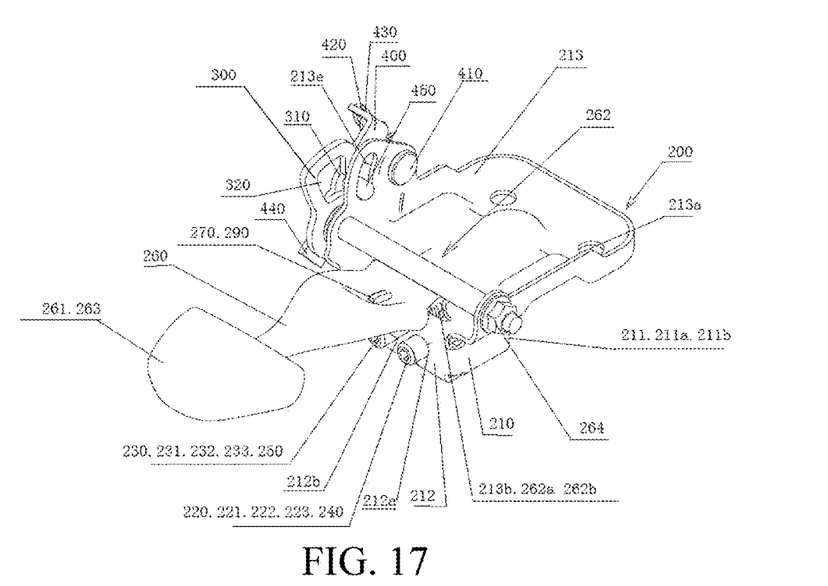
FIG. 17 is a schematic structural diagram of the locking mechanism according to Embodiment 2 of the present invention.
Figure 18:
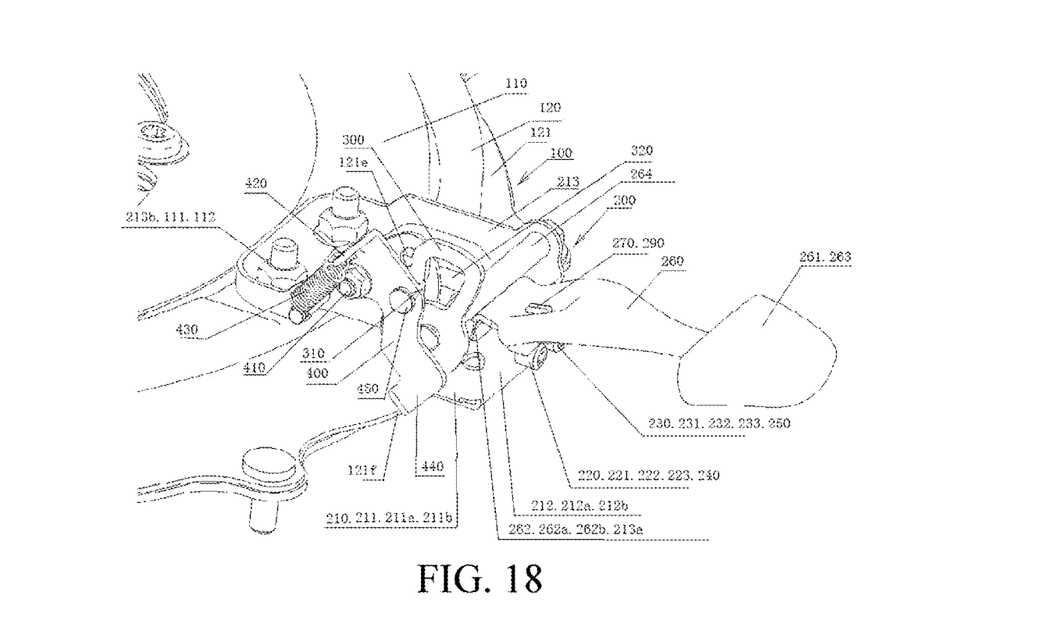
FIG. 18 is a three-dimensional schematic diagram of assembling between the locking mechanism and the seat rotation mechanism according to Embodiment 2 of the present invention.

To implement the foregoing function, in the present invention, the following improvements are performed to the locking mechanism 200: Referring to FIG. 17 and FIG. 18, a kidney-shaped hole 213e is disposed on the top surface 213 of the lock support 210 and a cam 300 rotating along with the release lever rotating shaft 264 is fixed to a shaft end of the release lever rotating shaft 264 on one side of the top surface 213 provided with the kidney-shaped hole 213e, where a stop pin avoiding slot 310 and a stop pin limiting slot 320 that are in communication with each other are disposed on the cam 300 and a squeezing shifting plate 400 is disposed axially on the cam 300.

An axis disposition point 410 between the squeezing shifting plate 400 and the cam 300 is located on a first end 420 of the squeezing shifting plate 400, the first end 420 of the squeezing shifting plate 400 is connected to the lock support 210 through a squeezing shifting plate return spring 430, and a stop pin 450 is fixed between the first end 420 and a second end 440 of the squeezing shifting plate 400. The squeezing shifting plate return spring 430 is a compression spring.

In addition, a squeezing protrusion 121f is disposed at a position, close to the lockhole 121a, on the outer circumference 121 of the fixed disc 120.

Figure 19:
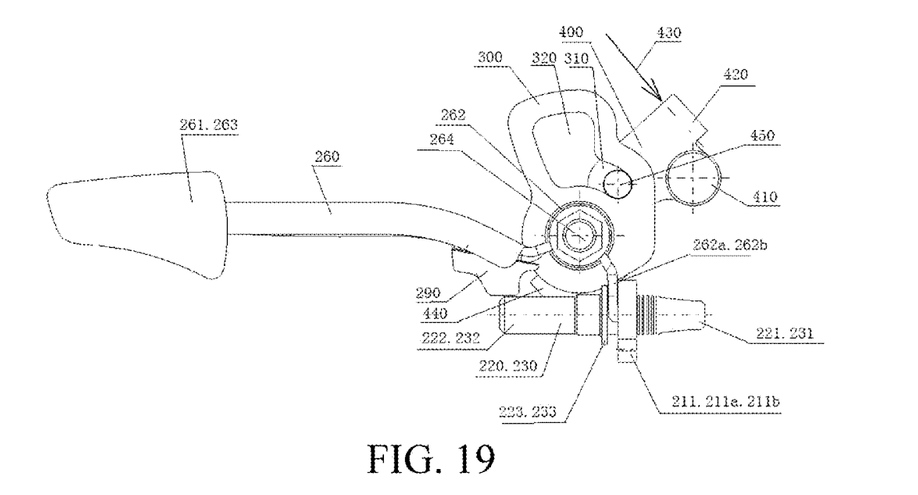
FIG. 19 is a schematic diagram of the locking mechanism in a locked state according to Embodiment 2 of the present invention.

Referring to FIG. 19, in the locked state, the release lever 260 is in the locked state under the action of the release lever return spring 270, and the two lock pins 220 and 230 are also in the locked state under the action of the two lock pin return springs 240 and 250. In this case, the cam 300 rotates along with the release lever rotating shaft 264 to the locking position. In this case, under the action of the squeezing shifting plate return spring 430, the stop pin 450 on the squeezing shifting plate 400 passes through the stop pin avoiding slot 310 and the kidney-shaped hole 213c and the stop pin 450 is located in the stop pin avoiding slot 310 and at a position of a second end 213bb of the kidney-shaped hole 213c.

Figure 20:
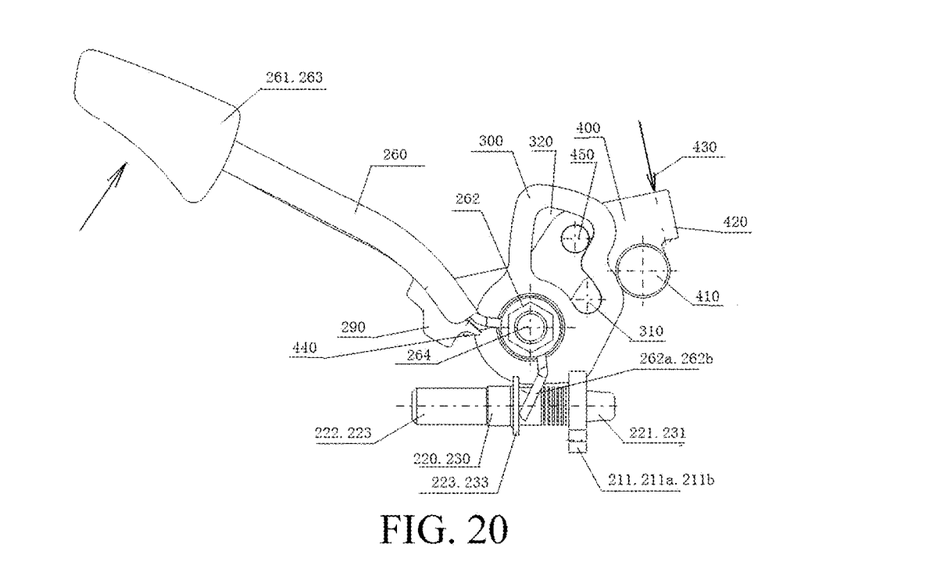
FIG. 20 is a schematic diagram of the locking mechanism in a released state according to Embodiment 2 of the present invention.

Referring to FIG. 20, after the release lever 260 is lifted up to the release position, the cam 300 rotates along with the release lever rotating shaft 264 to the release position. In this case, the stop pin 450 on the squeezing shifting plate 400 passes through the stop pin limiting slot 320 and the kidney-shaped hole 213c and the stop pin 450 is limited in the stop pin limiting slot 320 and to a position of a first end 213ba of the kidney-shaped hole 213c, the release lever 260 is enabled to be at the release position all the time and not return to the locking position even if a hand is released, and the release end of the release lever 260 drives the two lock pins 220 and 230 to be at the release position all the time, so that the tips of the first ends 221 and 231 of the two lock pins 220 and 230 are not in contact with the remaining part of the outer circumference 121 of the fixed disc 120 all the time and not scraped.

Figure 21:
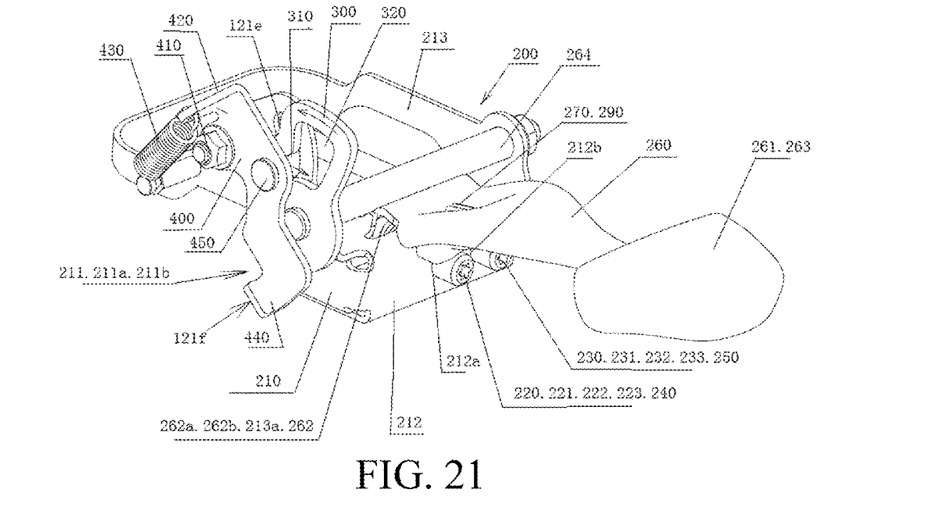
FIG. 21 is a schematic diagram of the locking mechanism returning to the locked state again according to Embodiment 2 of the present invention.

Referring to FIG. 21, when the rotating disc 110 rotates to the locking position, the second end 440 of the squeezing shifting plate 400 is in contact with the squeezing protrusion 121c on the outer circumference 121 of the fixed disc 120, the squeezing shifting plate 400 turns over counterclockwise under the action of the squeezing protrusion 121c, to enable the stop pin 450 to pass through the stop pin avoiding slot 310 and the kidney-shaped hole 213c again and enable the stop pin 450 to be located in the stop pin avoiding slot 310 and at the position of the second end 213bb of the kidney-shaped hole 213c. In this case, the stop pin limiting slot 320 in the cam 300 does not limit the stop pin 450, the release lever 260 returns to the locking position again under the action of the release lever return spring 270, and the two lock pins 220 and 230 are enabled to return to the locking position under the action of the lock pin return springs 240 and 250.

What is claimed is:
1. A seat rotation locking mechanism, comprising:
   a locking mechanism mounted on a rotating disc in a seat rotation mechanism; and at least one lockhole disposed on an outer circumference, and facing radially outward, of a fixed disc in the seat rotation mechanism,
wherein the locking mechanism comprises:
a lock support fixed on the rotating disc; and
at least two lock pins horizontally and moveably configured in the lock support,
wherein for each lock pin amongst the at least two lock pins, a first end of the lock pin is of a truncated-cone-shaped structure, and the first end of the lock pin is inserted into the lockhole, to implement zero-clearance locking by using wedging between the truncated-cone-shaped structure of the first end of the lock pin and the lockhole, wherein
a kidney-shaped hole is disposed on a top surface of the lock support and a cam rotating along with a release lever rotating shaft is fixed to a shaft end of the release lever rotating shaft on one side of the top surface provided with the kidney-shaped hole, a stop pin avoiding slot and a stop pin limiting slot that are in communication with each other are disposed on the cam and a squeezing shifting plate is disposed axially on the cam, an axis disposition point between the squeezing shifting plate and the cam is located on a first end of the squeezing shifting plate, the first end of the squeezing shifting plate is connected to the lock support through a squeezing shifting plate return spring, and a stop pin is fixed between the first end and a second end of the squeezing shifting plate;
a squeezing protrusion is disposed at a position on the outer circumference of the fixed disc;
after the release lever is lifted to a release position, the cam rotates to the release position along with the release lever rotating shaft, in this case, the stop pin on the squeezing shifting plate passes through the stop pin limiting slot and the kidney-shaped hole and the stop pin is limited in the stop pin limiting slot and to a position of a first end of the kidney-shaped hole, the release lever is enabled to be at a release position and not return to a locking position even if a hand is released, and for each lock pin amongst the at least two lock pins, the release end of the release lever drives the lock pin to be at the release position, so that a tip of the first end of the lock pin is not in contact with the remaining part of the outer circumference of the fixed disc and not scraped; and
when the rotating disc rotates to the locking position, the second end of the squeezing shifting plate is in contact with the squeezing protrusion, the squeezing shifting plate turns over under the action of the squeezing protrusion, to enable the stop pin to pass through the stop pin avoiding slot and the kidney-shaped hole and enable the stop pin to be located in the stop pin avoiding slot and at a position of a second end of the kidney-shaped hole, in this case, the stop pin limiting slot in the cam does not limit the stop pin, the release lever returns to the locking position again under the action of the release lever return spring, and the lock pin is enabled to return to the locking position under the action of the lock pin return spring.

2. The seat rotation locking mechanism according to claim 1, further comprising a lock pin return spring sleeved on each lock pin, wherein when the lock pin return spring is in a locked state, the first end of the lock pin is inserted, under the action of the lock pin return spring, into the lockhole on the outer circumference of the fixed disc to lock the rotating disc.

3. The seat rotation locking mechanism according to claim 2, further comprising
a release lever hinged to a top surface of the lock support through a release lever rotating shaft, wherein the release lever comprises a release end and an operation end, the release lever is driven by operating the operation end of the release lever to rotate, and for each lock pin amongst the at least two lock pins, the release end of the release lever drives the lock pin to move toward a release direction, so that the first end of the lock pin exits from the lockhole on the outer circumference of the fixed disc to release the rotating disc; and
a release lever return spring connected to the release lever and the lock support or the rotating disc, wherein the release lever return spring drives the release lever to return to the locked state; and
during releasing, the release lever return spring accumulates energy.

4. The seat rotation locking mechanism according to claim 3, wherein for each lock pin amongst the at least two lock pins, a silencing cap is sleeved on a tip of the first end of the lock pin, and the silencing cap is in contact with the outer circumference of the fixed disc.

5. The seat rotation locking mechanism according to claim 3, wherein a buffer component is fixed to the release lever, and in the locked state, the release lever is in contact with the lock support through the buffer component.

6. The seat rotation locking mechanism according to claim 3, wherein
the lock support comprises a first end surface close to the outer circumference of the fixed disc, a second end surface disposed opposite to the first end surface, and a top surface connecting the first end surface and the second end surface;
at least two first lock pin protruding holes are disposed on the first end surface, at least two second lock pin protruding holes are disposed on the second end surface, and the first lock pin protruding holes on the first end surface and the second lock pin protruding holes on the second end surface are in a one-to-one correspondence and coaxial; and
a first end and a second end of each lock pin respectively protrude from a corresponding first lock pin protruding hole and a corresponding second lock pin protruding hole.

7. The seat rotation locking mechanism according to claim 6, wherein
a releasing plate is fixed to each lock pin, one end of the lock pin return spring is in contact with the releasing plate, and the other end is in contact with the first end surface or the second end surface;
in the locked state, the release end of the release lever is not in contact with the releasing plate, in a released state, the release end of the release lever is in contact with the releasing plate and drives the lock pin, through the releasing plate, to move toward the release direction, and when the release lever is located at a middle position, the release end of the release lever is in contact with the releasing plate and drives the lock pin, through the releasing plate, to move toward the release direction.

8. The seat rotation locking mechanism according to claim 7, wherein at least two releasing shifting forks are disposed at the release end of the release lever, each releasing shifting fork corresponds to one lock pin, in the locked state, the releasing shifting fork is not in contact with the releasing plate, in the released state, the releasing shifting fork is in contact with the releasing plate and drives the lock pin, through the releasing plate, to move toward the release direction, and when the release lever is located at the middle position, the releasing shifting fork is in contact with the releasing plate and drives the lock pin, through the releasing plate, to move toward the release direction.

9. The seat rotation locking mechanism according to claim 3, wherein two blocking points are disposed on the outer circumference of the fixed disc, and the two blocking points are arranged at 180° and fit in with the seat rotation locking mechanism, to limit a rotation angle of the rotating disc to 0 to 180° through the seat rotation locking mechanism.

10. The seat rotation locking mechanism according to claim 3, wherein a silencing bushing is disposed in the lockhole, and in the locked state, and for each lock pin amongst the at least two lock pins, the first end of the lock pin is inserted into the silencing bushing under the action of the lock pin return spring to lock the rotating disc.

11. The seat rotation locking mechanism according to claim 3, wherein a plastic clip is mounted to a position at which a lockhole is disposed on the fixed disc, a guiding notch corresponding to the lockhole is disposed on the plastic clip, and for each lock pin amongst the at least two lock pins, the first end of the lock pin enters the lockhole through bottom guidance of the guiding notch in the plastic clip.

12. The seat rotation locking mechanism according to claim 2, wherein a silencing bushing is disposed in the lockhole, and in the locked state, and for each lock pin amongst the at least two lock pins, the first end of the lock pin is inserted into the silencing bushing under the action of the lock pin return spring to lock the rotating disc.

13. The seat rotation locking mechanism according to claim 1, wherein a silencing bushing is disposed in the lockhole, and in the locked state, and for each lock pin amongst the at least two lock pins, the first end of the lock pin is inserted into the silencing bushing under the action of the lock pin return spring to lock the rotating disc.

14. The seat rotation locking mechanism according to claim 1, wherein a plastic clip is mounted to a position at which a lockhole is disposed on the fixed disc, a guiding notch corresponding to the lockhole is disposed on the plastic clip, and for each lock pin amongst the at least two lock pins, the first end of the lock pin enters the lockhole through bottom guidance of the guiding notch in the plastic clip.

15. The seat rotation locking mechanism according to claim 1, wherein a silencing bushing is disposed in the lockhole, and in the locked state, and for each lock pin amongst the at least two lock pins, the first end of the lock pin is inserted into the silencing bushing under the action of the lock pin return spring to lock the rotating disc.

16. The seat rotation locking mechanism according to claim 1, wherein a plastic clip is mounted to a position at which a lockhole is disposed on the fixed disc, a guiding notch corresponding to the lockhole is disposed on the plastic clip, and for each lock pin amongst the at least two lock pins, the first end of the lock pin enters the lockhole through bottom guidance of the guiding notch in the plastic clip.

17. The seat rotation locking mechanism according to claim 1, wherein
- at least one outward protruding portion is disposed on the outer circumference of the fixed disc, the lockhole is disposed on each outward protruding portion, and each outward protruding portion is transitionally connected to the remaining part of the outer circumference of the fixed disc through an arc-shaped guiding surface, and
- for each lock pin amongst the at least two lock pins, the first end of the lock pin is not in contact with the remaining part of the outer circumference of the fixed disc before entering the arc-shaped guiding surface, and the first end of the lock pin is in contact with the arc-shaped guiding surface after entering the arc-shaped guiding surface.

\* \* \* \* \*